(12) United States Patent
McCormack et al.

(10) Patent No.: US 8,780,807 B2
(45) Date of Patent: Jul. 15, 2014

(54) WIRELESS NETWORK SYSTEM WITH ENHANCED ADDRESS CONFLICT RESOLVING FUNCTIONALITY

(75) Inventors: James Joseph Anthony McCormack, Eindhoven (NL); Franciscus Wilhelmus Adrianus Alphonsus Van Leeuwen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 148 days.

(21) Appl. No.: 13/510,321

(22) PCT Filed: Nov. 17, 2010

(86) PCT No.: PCT/IB2010/055224
§ 371 (c)(1),
(2), (4) Date: Jun. 19, 2012

(87) PCT Pub. No.: WO2011/064694
PCT Pub. Date: Jun. 3, 2011

(65) Prior Publication Data
US 2012/0250627 A1  Oct. 4, 2012

(30) Foreign Application Priority Data
Nov. 27, 2009 (EP) .................................. 09177330

(51) Int. Cl.
*H04W 4/00* (2009.01)

(52) U.S. Cl.
USPC ........................................ 370/328

(58) Field of Classification Search
None
See application file for complete search history.

(56) References Cited

U.S. PATENT DOCUMENTS

| 7,681,231 | B2 * | 3/2010 | Combs et al. ...................... 726/5 |
| 8,539,055 | B2 * | 9/2013 | Lv et al. ......................... 709/222 |
| 2003/0020595 | A1 | 1/2003 | Wacyk |
| 2004/0047298 | A1 * | 3/2004 | Yook et al. ..................... 370/254 |
| 2004/0081122 | A1 * | 4/2004 | Koodli et al. ................. 370/329 |

(Continued)

FOREIGN PATENT DOCUMENTS

| WO | 2005091572 A1 | 9/2005 |
| WO | 2007040398 A1 | 4/2007 |

OTHER PUBLICATIONS

Kilian Weniger; "Pacman: Passive Autoconfigureation for Mobile Ad Hoc Networks", IEEE Journal on Selected Areas in Communications, Piscataway, US, vol. 23, No. 3, Mar. 2005, XP011127688, pp. 507-519.

(Continued)

*Primary Examiner* — Otis L Thompson, Jr.

(57) ABSTRACT

A wireless network system (10) and a method of operating a wireless network system (10) is described. The wireless network system (10) comprises at least a control device (1) and a function device (21, 21', 21"). The control device (1) being configured to send an application control command to said function device (21, 21', 21") with a first network address (AD1) and the function device (21, 21', 21") being configured upon reception of said application control command to send an acknowledgement signal to said control device (1). The control device (1) sends conflict information to said function device (21, 21', 21") in case more than one acknowledgement signal is received, and said function device (21, 21', 21") upon reception of said conflict information stores a second network address (AD2), different from said first network address (AD1) in said device configuration memory (28), so that said function device (21, 21', 21") is addressable in said network system (10) using said second network address (AD2).

8 Claims, 5 Drawing Sheets

(56) References Cited

U.S. PATENT DOCUMENTS

| | | | |
|---|---|---|---|
| 2004/0258007 A1* | 12/2004 | Nam et al. | 370/310 |
| 2005/0036471 A1* | 2/2005 | Singh et al. | 370/338 |
| 2005/0097255 A1* | 5/2005 | Barenys et al. | 710/316 |
| 2005/0207447 A1* | 9/2005 | Sekiguchi et al. | 370/475 |
| 2006/0235997 A1* | 10/2006 | Munirajan et al. | 709/245 |
| 2006/0244624 A1 | 11/2006 | Wang et al. | |
| 2006/0253611 A1* | 11/2006 | Hu et al. | 709/245 |
| 2007/0133544 A1* | 6/2007 | Shida | 370/392 |
| 2007/0194728 A1* | 8/2007 | Beifus | 318/66 |
| 2007/0266125 A1* | 11/2007 | Lu et al. | 709/222 |
| 2008/0095154 A1* | 4/2008 | Jun et al. | 370/389 |
| 2008/0130673 A1 | 6/2008 | Cregg et al. | |
| 2008/0170538 A1* | 7/2008 | Duggi et al. | 370/328 |
| 2009/0092049 A1* | 4/2009 | Hargrave et al. | 370/235 |
| 2009/0245266 A1* | 10/2009 | Cho et al. | 370/401 |

OTHER PUBLICATIONS

Bernardos M. Calderon et al; "Survey of IP Address Autoconfiguration Mechanisms for MANETs", Internet Engineering Task Force, IETF, Standarworkingdraft, Internet Society 4, Rue Des Falaises CH-1205, Geneva Switzerland, No. 4, Nov. 2, 2008, XP015057346.

Saruwatari et al: "Speech Enhancement Using Nonlinear Microphone Array With Noise Adaptive Complementary Beamforming"; IEEE, 2000, pp. 1049-1052.

Shimizu et al: "Isotropic Noise Suppression in the Power Spectrum Domain by Symmetric Microphone Arrays"; 2007 IEEE Workshop on Applications of Signal Processing to Audio and Acoustics, Oct. 21-24, 2007, New Paltz, NY, pp. 54-57.

Zhang et al: "Maximum Likelihood Sound Source Localization and Beamforming for Directional Microphone Arrays in Distributed Meetings"; IEEE Transactions on Multimedia, vol. 10, No. 3, Apr. 2008, pp. 538-548.

McKinney et al: "Directionalizing Adaptive Multi-Microphone Arrays for Hearing Aids Using Cardioid Microphones"; IEEE International Conference on Acoustics, Speech, and Signal Processing, 1993,I-177-I-180.

* cited by examiner

WIRELESS NETWORK SYSTEM WITH ENHANCED ADDRESS CONFLICT RESOLVING FUNCTIONALITY

FIELD OF THE INVENTION

The invention relates to a wireless network system and a method of operating a wireless network system.

BACKGROUND OF THE INVENTION

Currently, wireless network systems are common for the connection of telecommunication or computing devices with corresponding networks. A present development seeks to provide wireless technology for a broader range of applications, such as for the control of household or commercial appliances, e.g. lighting devices, temperature sensors, electricity meters or heating devices using wireless remote control units.

A main difficulty of such applications is that generally a relatively high number of devices need to be configured and maintained while providing a user with a simple configuration during set-up and ease of use during operation. Usually in such network systems, each participating device has a distinguishable network address, so that it is possible to direct messages to a chosen device using its network address or to a user-defined group of devices with the corresponding addresses. For example, in a network system having a remote control unit and multiple controllable lighting devices, the remote control unit needs to be able to address a control command to the desired device or to process received sensor readings appropriately.

In such network systems, it is therefore usually important that no address duplication occurs, i.e. that not more than one device is assigned the same network address. Especially in network systems using concurrent address allocation, e.g. in networks where addresses are assigned by multiple remote control units simultaneously, address duplication may easily occur and needs to be addressed.

Methods exist in the prior art to address the problem of address duplication in a network system. For example, US 2003/0020595 A1 discloses a system and a method for configuration of wireless networks using position information. The devices of the network system are provided with ultra-wideband radio transmitters to allow determining the distance between the devices.

According to the document, a specific binding procedure is initiated in the configuration stage of the wireless network system. During the binding procedure, a controller requests each device to send its respective preprogrammed address. The device closest to the controller is then chosen and all further devices are queried as to whether a further device shares the same network address. In case address duplication is detected, the affected devices are controlled to randomize their addresses. The process is then repeated for all devices and addresses until the binding and thus the configuration of the network system is complete.

The method disclosed in US 2003/0020595 A1 addresses the problem of address duplication.

It is therefore an object of the present invention to provide a wireless network system, which enables a cost-efficient, easy and reliable configuration and operation of the system.

SUMMARY OF THE INVENTION

The object is solved by a wireless network system and a method of operating a wireless network system according to claims 1 and 13. The dependent claims relate to preferred embodiments of the invention.

The basic idea of the invention is to provide a wireless network system in which address duplication—sometimes also referred to as a network address conflict—is detected and resolved during normal operation without the need for a special binding or commissioning procedure, enabling to use any, e.g. a standard binding or commissioning procedure.

The wireless network system according to the invention comprises at least a control device and a function device, configured for operation in the network. Each device has a communication interface for transmitting and receiving data over a wireless medium, which is preferably a shared medium. The communication interface may be of any suitable type, for example an optical communication interface, although preferably, the communication interface is a radio frequency (RF) communication interface, most preferred configured for communication with a standard communication protocol, such as IEEE 802.11 or IEEE 802.15.4.

The function device further comprises a first network address. The network address may be of any suitable kind to enable that the function device is under normal circumstances individually addressable in the network system, i.e. providing that no address conflict is present. The format and length of the network address may depend on the specific communication protocol used and, with regard to the length of the network address, i.e. the available address range, certainly on the intended size of the network or the number of devices. Since it is only needed to address the devices, being part of the network individually, a "network-wide" unique address is preferred. However, the network address should preferably enable that each of the devices in the network system is individually addressable. The first network address may be predefined, e.g. factory-set or assigned by said control device during a prior commissioning or binding procedure. Certainly, also the control device may preferably be provided with a dedicated network address to receive unicast messages, such as e.g. sensor readings, appropriately.

According to the invention, the function device further comprises a device configuration memory for storing at least a second network address. The device configuration memory may be of any suitable type, for example a variable memory, such as one or more internal or external RAM or FLASH memory units. To allow an enhanced reconfiguration, the first network address is preferably stored in said device configuration memory.

According to the invention, the function devices further comprises an application interface connectable to an application device and configured to receive an application control command over said wireless medium, e.g. from said control device. The application interface is connectable to an application device, e.g. for performing a controlling, switching or sensing function upon reception of said application control command. The application device may be of any suitable kind, such as a lighting unit, a heating device or any other type of electrically controllable device. For example, in case of a connected lighting unit, the application interface may be configured to switch the lighting unit on and off or to dim the lighting unit upon reception of the corresponding application control command. Further, the application interface may alternatively or additionally be configured to send an application data value of a connected application device in response to an application control command, for example a temperature reading of a temperature sensor, the reading of a water or electricity meter or an alert of a smoke or fire detector over said wireless medium.

Preferably, said function device is integrated with the application device, e.g. comprised in a lighting unit.

Certainly, the control and/or the function device may comprise further components, such as for example a power supply unit, e.g. a battery or a mains-connected power-supply unit, a processing unit, a user interface or further memory. Preferably, the control device and/or the function device each comprise a central processing unit, adapted at least to send/receive commands over the communication interface and implementing at least part of the behavior of each of the devices. The central processing unit may at least partly be controlled using a suitable programming, comprised in a memory.

According to the invention, the control device is configured to send an application control command to said function device with said first network address. The control device thus provides an operating command to control the application interface of said function device, e.g. to control the application device or to poll an application data value. Upon reception of said application control command, the function device sends an acknowledgement signal to said control device to confirm the receipt of the application control command. The acknowledgement signal may be of any suitable type and at least comprises an indication that the application control command of the control device has been received by said function device. The acknowledgement signal may further comprise data, for example a sensor reading, etc. Preferably, the acknowledgement signal comprises the first network address to allow a simple identification of the origin of the signal. The received application control command may be forwarded directly to the application interface or temporarily stored in a suitable memory, e.g. in the device configuration memory.

According to the invention, the control device receives said acknowledgement signal and determines, whether more than one acknowledgement signal is received. In case more than one acknowledgement signal is received by said control device, i.e. more than one network device responded to the application control command addressed with the first network address, an address conflict is detected. Accordingly, the control device sends conflict information at least to said function device.

Upon reception of said conflict information by said function device, the function device stores a second network address, different from said first network address in said device configuration memory, so that the function device is addressable in the network system using the second network address. An address conflict is thus detected during operation of the network system, i.e. in response to an application control command. The invention thus advantageously enables to solve address duplication when needed during operation of the inventive wireless network system, i.e. in a network communication mode.

A main advantage of the present invention is that no elaborate address allocation or binding procedure for detecting address conflicts is necessary during set-up or configuration of the network system. Instead, all address conflicts are solved when they occur during operation of the network system, i.e. at a stage, when the function device is configured for network operation with a corresponding network address and is bound with a control device, also referred to as "non-virgin" or "non-factory new" function device.

The present arrangement is particularly advantageous in networks, which mainly use broadcast, multicast or groupcast communication for the control of the function devices, such as for example in lighting networks. Furthermore, the present invention is advantageous in case of concurrent address allocation, e.g. in case more than one control device is provided to commission and assign a network address to a joining function device, since in this case, it usually is difficult to ensure that no address duplication occurs.

Although the invention has been described above with reference to a single control device and a single function device, it should be noted that the network system may certainly comprise multiple control, function or other network devices. Preferably, the wireless network system comprises at least two control devices, i.e. a first and a second control device, configured for parallel, i.e. simultaneous operation and/or commissioning.

As discussed above, the second network address is further stored in said device configuration memory so that said function device is addressable in the network system using said second network address. In case said first network address is stored in said device configuration memory, the function device is preferably configured to delete or overwrite said first network address, since this address is no longer needed.

To obtain the second network address, the function device may be configured to choose said address itself once the conflict information is received, e.g. using a predefined network address allocation method or by randomly choosing a network address according to the communication protocol used and the given address space.

According to a development of the invention, the control device is configured to assign and to send said second network address to said function device. The present embodiment provides a further improved address conflict resolution, enabling to assign the second network address according to a central, predefined network address allocation method of the control device. Furthermore, the assignment of said second network address by the control device bears the advantage that the control device already "knows" the address for subsequent application control, omitting an elaborate transmittal of the second address to the control device. Preferably, the control device is configured to store the second network address in a suitable memory, e.g. in a variable network configuration memory.

As discussed above, said control device may particularly be configured to assign said second network address according to a predefined network address allocation method. For example, the control device may be configured to assign addresses in the given address space consecutively and to store a network variable relating to the last address assigned, so that the control unit may assign the function device a network address outside of the already allocated range.

Alternatively or additionally, the control device may be configured to operate in an address collection mode, in which the control device broadcasts an address request command and consecutively receives the addresses of all devices in the network. The control device may in this case be configured to determine an unused address of the given address space according to the present network system and to assign said unused address to the function device as said second network address. The second network address is then sent to said function device.

Various possibilities exist to transmit the second network address to the function device. For example, the second network address may be comprised in the conflict information, send by the control device to the function device. Alternatively or additionally, said second network address may be transmitted in an address update message, e.g. send consecutively to the transmission of the conflict information.

To enhance the assignment of said second network address and to further simplify the communication of the devices in case of an address conflict, the function device may preferably comprise a predefined identifier, allowing to individualize said function device. For example, the predefined identifier may be a factory set address or a randomly chosen key, so that in case of a network address conflict, said identifier enables a directed, i.e. unicast communication with said function device, even if further devices share the same network address. Certainly, it is sufficient when said predefined identifier is "quasi-unique", so that with a relatively high probability, two devices having the same identifier will not be present in the same wireless network system. The predefined identifier may be hard coded, e.g. in the communication interface or comprised in a suitable memory, e.g. in said device configuration memory.

Preferably, the predefined identifier is an extended address, e.g. a unique MAC-address. Most preferably in the latter case, the network address is a short address, i.e. shorter than said predefined identifier.

The predefined identifier may be particularly advantageous to select said function device in case of an address conflict. It is therefore preferred that said control device sends said second network address to said function device addressed with said predefined identifier. According to the above mentioned embodiments, the conflict information and/or the address update message may thus preferably be sent to said function device addressed with said predefined identifier.

The predefined identifier may be stored in said control device e.g. in a corresponding network configuration memory during commissioning or binding, so that the control device, in case of an address conflict is able to address the function device appropriately with said predefined address.

Alternatively or additionally and according to a development of the invention, the function device may be configured to send said predefined identifier to said control device in response to said application control command or said conflict information.

The present embodiment advantageously allows the above mentioned selection of the function device in case of an address conflict without the need to have a list of the devices with the corresponding predefined identifiers stored in the control device.

As discussed above, the function device may be configured to send said predefined identifier to said control device in response to said application control command, e.g. comprised in said acknowledgement signal. In case of an address conflict, the control device then already is aware of the predefined identifiers of all conflicting devices, once the acknowledgement signals are received. Especially in this case, the control device may preferably be configured to provide said second network address in said conflict information, addressed with said predefined identifier.

Although the above embodiment allows a very efficient communication with only a limited number of transmissions to be exchanged between the control device and the function device, the predefined identifier will always be transmitted in said acknowledgement signal, increasing the protocol overhead even in case no address duplication occurs.

Therefore, it may alternatively be possible that the function device is configured to send said predefined identifier to said control device in response to said conflict information. The control device may then send said second network address to the function device in said address update message, as discussed above. Since the predefined identifier according to the present embodiment is only transmitted in case of a detected address conflict, the protocol overhead is significantly reduced.

Preferably, the function device upon storing said second network address provides an identification signal. The identification signal may be of any suitable type to allow a user to identify and select the function device, e.g. a visual or acoustic signal. The identification signal allows the user in case of an address conflict to verify, whether the function device has been properly selected.

As discussed above, the communication interfaces of the devices may be configured for use in standard network systems. The communication of the control device and the function device may therefore correspond to any suitable communication protocol known today according to which a wireless communication may be established. A suitable group of preferred communication protocols for implementing the present invention are usually referred to as ad-hoc wireless network systems.

A particularly suitable and preferred communication protocol for implementing the present invention is Zigbee. Therefore, according to a development of the invention, the communication interface is configured for use in a Zigbee network system.

Zigbee is an open standard and is based on the IEEE 802.15.4 communication protocol, which defines a physical link layer (PHY) and a media access control layer (MAC). Zigbee uses this protocol and defines a network layer (NWK) and an application layer (APL) on top of the MAC-layer, provided by IEEE 802.15.4. A description of Zigbee and the Zigbee protocol stack is disclosed in the Zigbee specification e.g. in document "1_053474r17ZB" describing "Zigbee 2007", dated Jan. 17, 2008, available from the Zigbee Alliance Inc.

Most preferably, the communication interface is configured for Zigbee Pro, which allows an advantageous "flat" network address assignment. An explanation of Zigbee Pro and a corresponding communications stack is disclosed in document 074855r05, dated January 2008, available from the Zigbee Alliance, Inc.

Referring to Zigbee, the predefined identifier preferably corresponds to a MAC-address, sometimes also referred to an extended address. Said network address preferably corresponds to a Zigbee short address of a given personal area network (PAN), i.e. the present network system. The above mentioned application control command most preferably refers to a communication on the application layer and may correspond to an application object.

Most preferably, the control device is an end device. In the context of the present invention, an "end device" is a network device, which has no routing capabilities and which is not necessarily permanently active in the network system. The device may be in a "dormant" or sleep mode for long periods and only active, when a transmission, e.g. an application control is needed. Its overall power consumption is thus dramatically reduced. Preferably, the control device corresponds to a Zigbee end device and most preferably; the control device is a reduced function device (RFD), according to Zigbee.

According to a development of the invention, the network device is a mobile device, wherein the term "mobile" is understood to include devices, which are easily transportable by hand, i.e. having an adequate size and weight. Preferably, said mobile device is not mains-connected, e.g. having a battery or other suitable power supply.

According to a preferred embodiment of the invention, the control device comprises a user control interface for initiation of said application control command. In the context of the present invention, the term "user control interface" is understood to comprise any interface for user interaction, like an input interface for the initiation of an application control command to be sent or a display device for display of said application data value. For example, the user control interface may comprise several buttons and/or an LCD-display. Certainly, the control device may be configured to control more than one function device with properly addressed application control commands. The control device preferably is a remote control device, e.g. battery-operated.

Most preferably, the function device is a lighting unit comprising at least a light source. The light source is connected to said application interface, so that said light source is controllable with a corresponding application control command. The light source may be of any suitable type, such as an incandescent, halogen, fluorescent or LED light source. Most preferably, the light source is configured for room or office lighting. The light source may be connected to said application interface for control of any suitable parameter. For example, the application interface may be configured to switch the light source on and off, to dim the light source and/or to set the light color in case of a color-controllable light source.

Further advantageous embodiments are mentioned in the dependent claims.

BRIEF DESCRIPTION OF THE DRAWINGS

The above and other objects, features and advantages of the present invention will become apparent from the following description of preferred embodiments, in which.

DETAILED DESCRIPTION OF EMBODIMENTS

Figure 1:
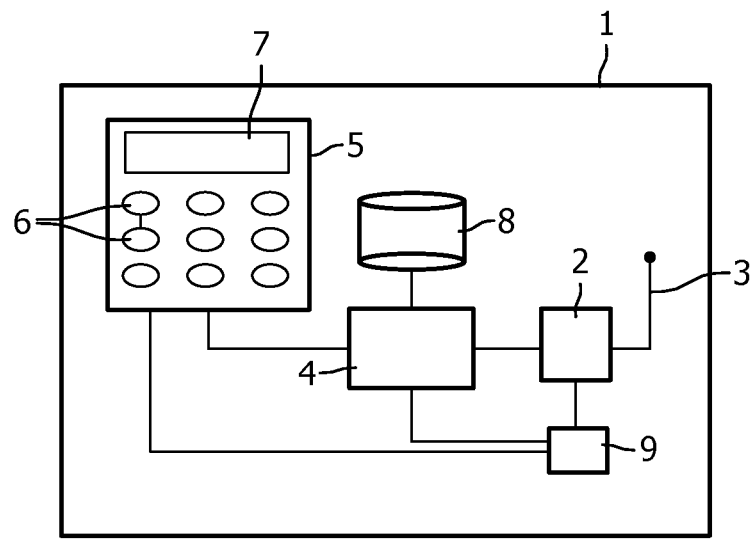
FIG. 1 shows an embodiment of a control device in a schematic view.

FIG. 1 shows a first embodiment of a control device 1, in the present example a remote control device in a schematic representation. The control device 1 comprises a communication interface 2 with a suitable antenna 3, provided for a radio frequency wireless communication according to Zigbee and IEEE 802.15.4 communication protocols, in the following referred to as 'Zigbee' or 'Zigbee protocol'. IEEE 802.15.4 provides a physical link layer (PHY) and a media excess control layer (MAC). Zigbee provides a network layer (NWK) and an application layer (APL) on top of the MAC-layer. A description of Zigbee and the Zigbee protocol stack is disclosed in the Zigbee specification, e.g. in document 053474r17ZB, dated Jan. 17, 2008, available from the Zigbee Alliance Inc. The communication interface 2 may further implement the Zigbee pro stack profile. An explanation of the Zigbee pro and a corresponding communications stack is disclosed in document 074855r05, dated January 2008, available from the Zigbee Alliance Inc.

The communication interface 2 is connected to a CPU (central processing unit) 4, which controls the communication over the communication interface 2 using, e.g. a microcontroller with a suitable programming. The CPU 4 is connected with a user control interface 5, having buttons 6 and an LCD display 7 for network control functions and for the initiation of an application control command, as explained in the following. A variable network configuration memory 8 is provided for storing network addresses and further communication data. A battery 9 supplies all components of the control device 1 with electrical power. The control device 1 is a Zigbee end-device, sometimes referred to as reduced functionality device (RFD), and is dormant, when no communication is needed, thus saving battery power.

The network device 1 may communicate to other wireless devices over the communication interface 2, forming a communications network using the Zigbee protocol, which provides network functionality, including addressing, medium access, routing capabilities, etc.

Figure 2:
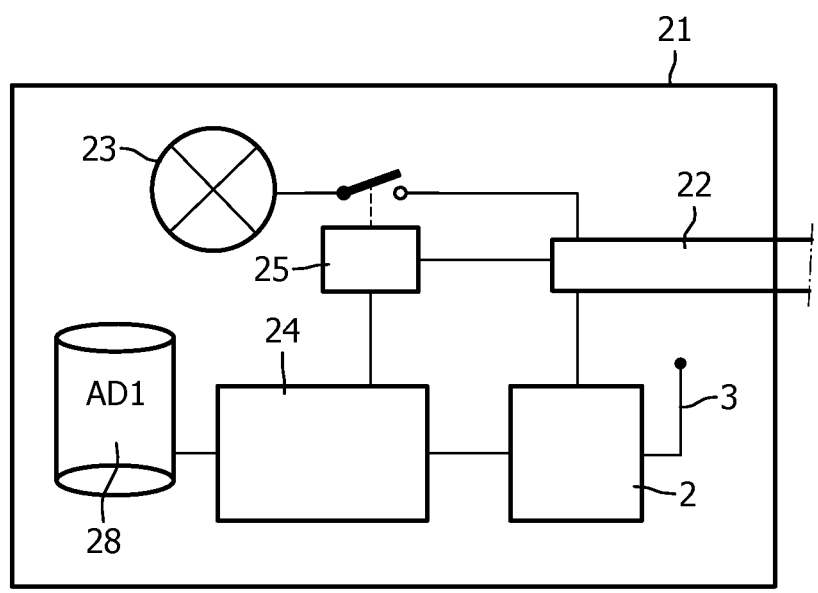
FIG. 2 shows a first embodiment of a function device in a schematic view.

The control device 1 allows to control at least a function device 21, which is shown in FIG. 2 in a schematic view according to a first embodiment. The function device 21 comprises, correspondingly to the control device 1, a communication interface 2, provided for wireless RF-communication according to Zigbee. The communication interface 2 comprises a predefined MAC-address for communication on the MAC-layer and is connected to a CPU 24, which controls the communication. The MAC-address with reference to Zigbee is an extended network address, i.e. a 64-bit-unique identifier.

The CPU 24 is connected to a device configuration memory 28 and an application interface 25, which according to the present embodiment, is arranged to control a lamp 23, i.e. to switch the lamp 23 on and of and to dim the lamp 23. The application interface 25 is controllable over the network upon reception of a corresponding application control command from a control device, such as the remote control device 1. All components are connected to a power-supply unit 22, having a mains connection (not shown).

The function device 21 is configured for communication in the wireless network system and to receive application control commands of the control device 1. The function device 21 is thus commissioned, i.e. configured with all necessary communication parameters, e.g. channel selections, an optional network key and most important, with a first network address, depicted in FIG. 2 with "AD1", assigned by the control device 1. The first network address is stored in the network configuration memory 28 of the function device 21 and in the network configuration memory 8 of the control device 1 (not shown). The first network address AD1 provides that the function device 21 is uniquely addressable in the network system, i.e. that the function device 21 is addressable for unicast communication with said address AD1.

The network address is a short network address, which with reference to Zigbee is a 16-bit network-wide unique identifier for communication in the present network system (personal area network, PAN) on the network layer (NWK). As discussed above, the network address AD1 has been assigned to the function device 21 by the control device 1 in a prior commissioning or binding procedure, e.g. a standard commissioning procedure as described in the Zigbee specification. To allow a commissioning by the control device 1, a predefined address range out of the given address space is assigned to the control device 1. In the present example of a Zigbee network, the short network address is a 16-bit address, so that a total of 65.536 short addresses are assignable.

Both, the control device 1 and the function device 21 are configured to detect and resolve an address conflict, also referred to as address duplication, during operation in response to an application control command, directed to said function device 21. Such an address conflict may occur when a network address is accidentally assigned to more than one device. The corresponding operation and transmission of messages in case of an address conflict is explained in the following with reference to the embodiments of FIG. 3-7.

Figure 3:
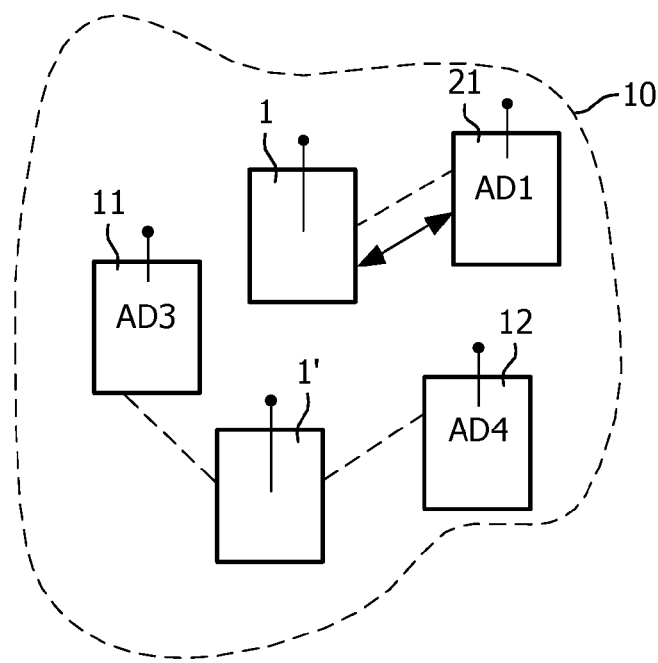
FIG. 3 shows an embodiment of a wireless network system in a symbolical representation.

FIG. 3 shows an embodiment of a network system (PAN) 10 comprising the control device 1, the function device 21, a second control device 1' and further function devices 11, 12. As indicated by the dotted lines in FIG. 3, the function device 21 is bound to the control device 1, while the further function devices 11, 12 are bound to the second control device 1', i.e. the devices 21, 11, 12 are configured to be controlled by the associated control device 1, 1'. As explained above, the first network address AD1 is assigned to the function device 21. Both further function devices 11, 12 are commissioned by the second control device 1' with corresponding short network addresses AD3 and AD4.

In the following, it is assumed that the lamp 23 of the function device 21 is to be controlled individually, i.e. using a unicast application control command. Upon activation of the corresponding button 6 of the control device 1, the control device 1 thus sends an application control command to the function device 21 addressed with the first network address AD1. The function device 21 upon reception of the application control command sends an acknowledgement signal to the control device 1 and passes the application control command to the application interface 25, which accordingly controls the lamp 23.

According to the embodiment of FIG. 3, the further devices 11, 12 do not react, since the application control command is addressed with the first network address AD1, which is only and uniquely assigned to the function device 21. The network 10 is thus normally operable and enables a directed, i.e. unicast communication.

Figure 4:
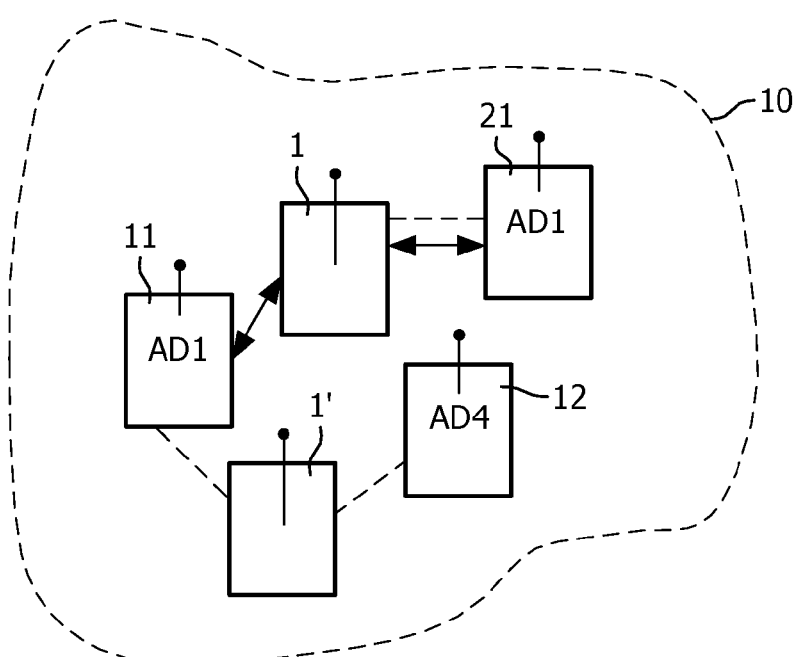
FIG. 4 shows a second embodiment of a wireless network system.

However, especially in case the network system 10 comprises two control devices 1, 1', which both commission devices and simultaneously assign addresses to the network devices, address duplication may easily occur, as can be seen from FIG. 4. Here, the first network address AD1 is also assigned to device 11. Both, the function device 21 and the further function device 11 thus receive the application control command, addressed with AD1. To enable a unicast communication in such situations, the address conflict is detected and resolved.

Figure 5:
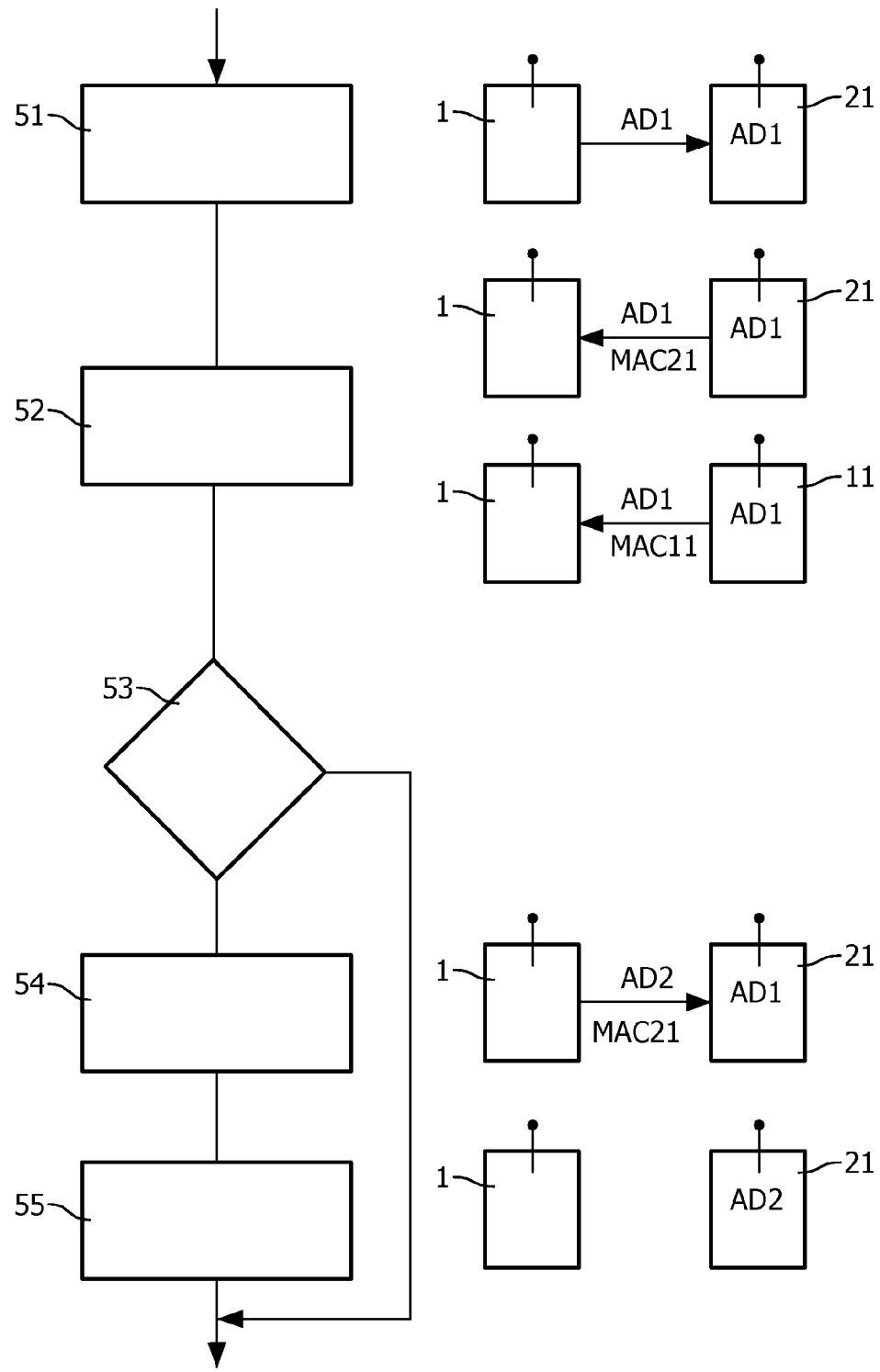
FIG. 5 shows a flow chart of a first embodiment of the communication in case of a network address conflict.

FIG. 5 shows a flow chart of a first embodiment of the communication in case of an address conflict together with a graphical representation of the transmitted messages. The communication is implemented according to the following steps:

1. Upon activation of a control button 6 of the user control interface 5, the control device 1 sends the corresponding application control command to the function device in step 51, e.g. a "lamp on" command, addressed with the first short network address AD1.

2. The function device 21 in step 52, upon reception of said application control command, forwards the command to the application interface 25 for the control of the lamp 23. Additionally, the function device 21 sends an acknowledgement signal to the control device 1, comprising address AD1 and its MAC-address for identification. According to the example of FIG. 3, also the further function device 11 responds with AD1 and the respective MAC-address, since AD1 is also assigned to this device.

3. In step 53, the control device 1 then determines, whether more than one acknowledgement signals from further devices are received. According to the arrangement shown in FIG. 4, a further acknowledgement signal is received from function device 11 and an address conflict is detected by said control device 1. In the case of FIG. 3, i.e. only one acknowledgement signal is received, no address conflict is currently present and the procedure ends directly.

4. Upon detection of the address conflict, the control device in step 54 selects one of the devices, e.g. function device 21, and sends conflict information to the function device 21, comprising a second network address AD2. The conflict information is addressed with the MAC-address of function device 21, so that only function device 21 considers the message. The second network address AD2 is determined from the predefined address range, assigned to the control device 1, i.e. an unallocated address of the predefined range.

Figure 7:
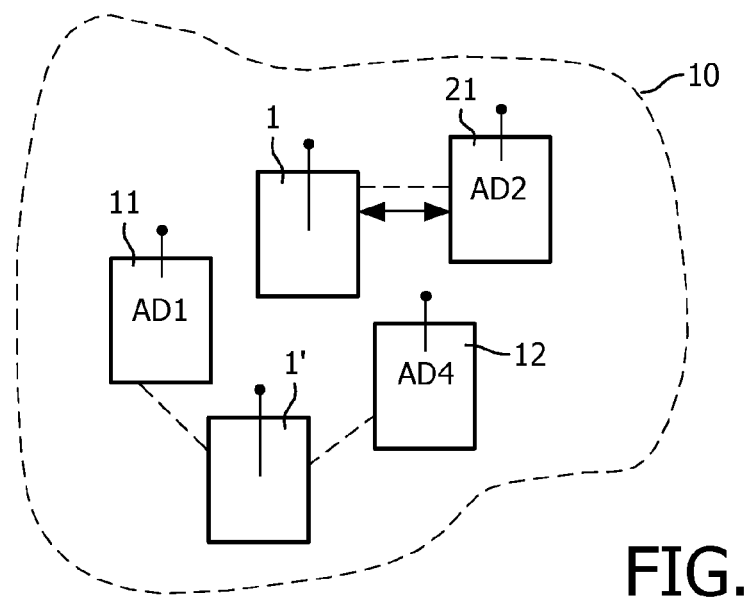
FIG. 7 shows a schematic drawing of a wireless network system after an address conflict has been resolved and FIGS. 8a and 8b show further embodiments of a function device in schematic views.

5. The function device 21 receives said conflict information in step 55, deletes AD1 from and stores AD2 in its device configuration memory 28. The function device then activates the lamp 23 as an identification signal for the user and the procedure ends. The function device 21 is then conflict-free addressable in the network system 10 using network address AD2, as shown in FIG. 7.

Figure 6:
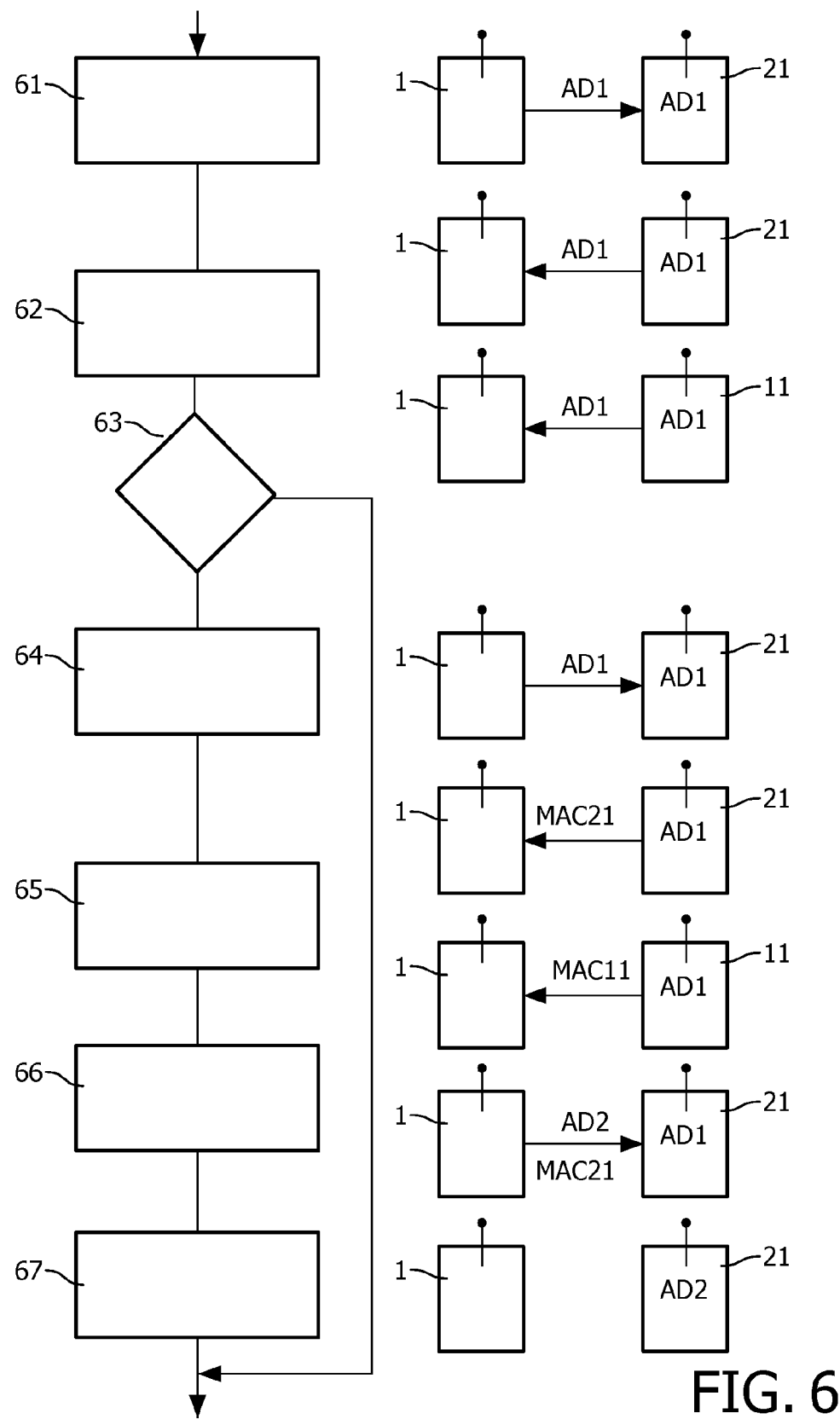
FIG. 6 shows a flow chart of a further embodiment of the communication in case of a network address conflict.

FIG. 6 shows a flow chart of a further embodiment of the communication in case of an address conflict. The communication mainly corresponds to the embodiment, shown in FIG. 5. However, according to the embodiment of FIG. 6, the acknowledgement signal does not comprise the MAC-address, which reduces the protocol overhead in case no address conflict is present. The communication according to the present embodiment is implemented according to the following steps:

1. Corresponding to step 51 of FIG. 5, the control device 1 sends the application control command to the function device, addressed with AD1 in step 61 upon activation of the corresponding control button 6 of the user control interface 5.

2. The function device 21 in step 62, upon reception of said application control command forwards the command to the application interface 25 for the control of the lamp 23. Additionally, the function device 21 sends an acknowledgement signal to the control device 1, comprising address AD1 for identification. Also further device 11 responds and returns an acknowledgement signal, comprising AD1.

3. In step 63, the control device 1 then determines, whether more than one acknowledgement signals are received. According to the present example, a further acknowledgement signal is received from function device 11 and address duplication is detected.

4. Upon detection of address duplication, the control device in step 64 sends conflict information, addressed with AD1, i.e. an indication, that an address conflict is present.

5. The function devices 21, 11 receive said conflict information in step 65 and send their respective predefined MAC-addresses to the control device 1. The conflict information of step 64 thus corresponds to an address query command.

6. Consecutively, the control device 1 upon reception of the MAC-addresses in step 66 selects one of the devices, e.g. function device 21, and sends an address update message to the function device 21, addressed with the MAC-address of the function device 21 and comprising a second network address AD2. The control device 1 further stores the address AD2 for application control in its network configuration memory 8.

7. The function device 21 upon reception of the address update message erases AD1 and stores AD2 in its device configuration memory 28 in step 67. The function device activates the lamp 23 as an identification signal for the user and the procedure ends. The function device 21 is then addressable in the network system 10 using AD2, as shown in FIG. 7.

Although the above mentioned method according to the embodiment of FIG. 6 involves a greater number of transmissions in case of an address conflict than the method according to FIG. 5, the protocol overhead in case no address conflict is present is significantly reduced, since the MAC-addresses are only communicated in case of an address conflict. This might be especially advantageous in case of a network topology with only limited available bandwith.

As discussed above with reference to the embodiments of FIGS. 5 and 6, the control device 1 in step 54 and step 66 selects one of the conflicting devices. The selection may be, most simply, at random or according to a given selection scheme. The respective device, to which AD2 has been assigned activates its lamp 23, so that the user may verify the selection. In case the user intends to control a different device, a re-selection process may be conducted, e.g. with the actuation of a corresponding "re-select" button on the interface 5 of the control device 1.

Upon activation of the re-selection process, the control device 1 sends an address update message comprising a further address "ADx" to the next conflicting device, from which the MAC-address has been received in step 53/66, i.e. in the present case to the further device 11. The address update message is addressed with the corresponding MAC-address of the further device 11. The address ADx is then stored in the network configuration memory 8 of the control device 1 and the device configuration memory 28 of the further device 11, respectively. The further device 11 then activates its lamp 23 for identification to the user.

In case more than two devices share the same network address, the re-selection process may be conducted for the next received MAC-address, respectively.

Figure 8A:
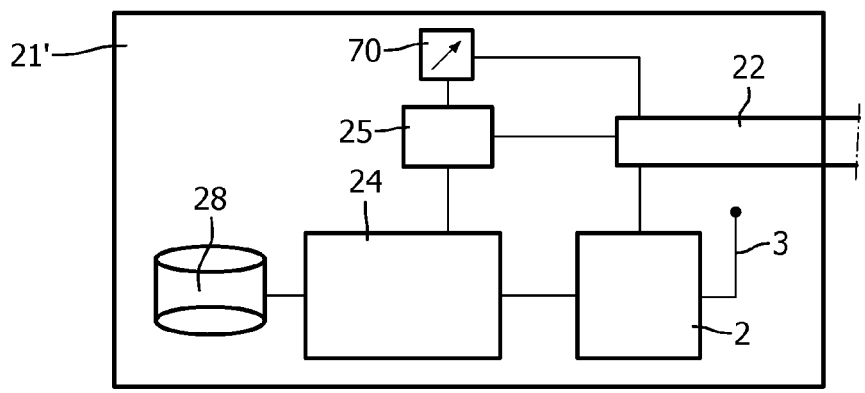

The above mentioned embodiments are not limited to function devices 21 having a lamp 23. FIG. 8a shows a second embodiment of a function device 21', which is identical in all aspects to the function device 21, with the exception that instead of a lamp 23, a temperature sensor 70 is connected with application interface 25 for providing a corresponding application data value to the control device 1, which is upon reception displayed to the user on the display 7 of the control device 1.

Figure 8B:
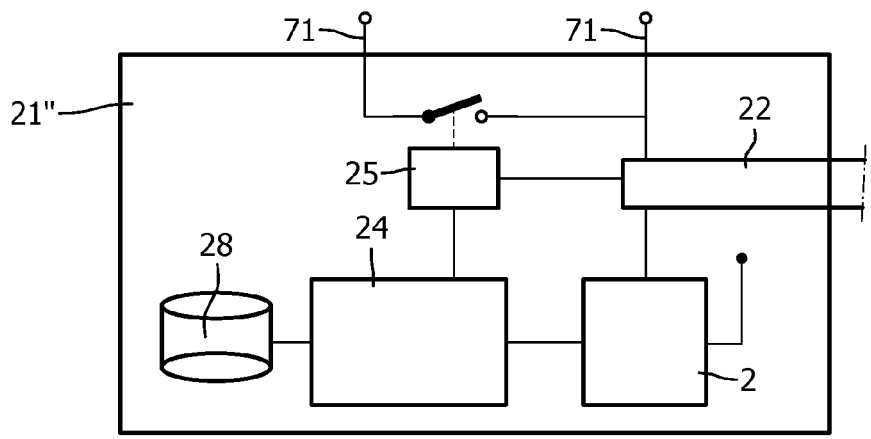

FIG. 8b shows a further embodiment of a function device 21", which is also identical to the previously described function device 21, with the exception that the application interface 25 is configured to control an external appliance. The appliance is connectable to the terminals 71 and may be for example, a household appliance, like a heating device, enabling to remotely switch the appliance on and off using a corresponding button 6 on the interface 5 of the control device 1. The communication in case of an address conflict certainly corresponds to the communication explained above.

The invention has been illustrated and described in detail in the drawings and the foregoing description. Such illustration and description are to be considered illustrative or exemplary and not restrictive. The invention is not limited to the disclosed embodiments.

For example, it is possible to operate the invention in an embodiment, wherein:
the network communication corresponds to the IEEE 802.11 protocol,
the control device 1, 1' is not a remote control device, but a computer or a wall switch,
the communication interface 2 is configured to use a standard Zigbee address allocation method, instead of Zigbee Pro,
the function device 21, 11, 12, instead of comprising a lamp 23, comprises a further application device or is connected to an application device, such as a humidity sensor, a fire detector, a smoke detector, a water meter, an electricity meter, a gas meter, a heating device or any other type of controllable appliance,
the MAC-address of the function device 21, 21', 21" is stored in a suitable memory, instead of being comprised in the communication interface 2 and/or
the control device 1, instead of determining the second address AD2 from said predefined address range, is configured to broadcast an address collection message, upon which all other devices in the network return their respectively assigned network addresses. The control device 1 then determines an unallocated address and assigns the latter address to the function device 21 as AD2.

Other variations to the disclosed embodiments can be understood and effected by those skilled in the art practicing the claimed invention from the drawings, the disclosure and the appended claims.

In the foregoing description and in the appended claims, a reference to the singular is also intended to encompass the plural and vice versa and reference to a specific number of features or devices are not to be construed as limiting the invention to the specific numbers of features or devices. Moreover, expressions such as "include" or "comprise" do not exclude other elements and the indefinite article "a" or "an" does not exclude a plurality.

The mere fact that certain measures are recited in mutually different dependent claims does not indicate that a combination of these measures cannot be used to advantage.

A computer program may be stored/distributed on a suitable medium, such as an optical storage medium, a magnetic storage medium or a solid-state medium supplied with or as part of other hardware, but may also be distributed in other forms, such as via the Internet or other wired or wireless telecommunication system.

Any reference signs in the claims should not be construed as limiting the scope of the claims.

The invention claimed is:

1. Wireless network system, comprising
a control device having a communication interface for transmitting and receiving data over a wireless medium and
a function device comprising
a communication interface for transmitting and receiving data over a wireless medium,
a first network address (AD1),
a device configuration memory and
an application interface connectable to an application device and configured to receive an application control command over said wireless medium,
where said control device being configured to send said application control command to said function device with said first network address (AD1),
said function device being configured upon receipt of said application control command to at least send an acknowledgement signal to said control device,
said control device being configured to send conflict information to said function device in case more than one acknowledgement signal is received,
said function device being configured upon receipt of said conflict information to store a second network address (AD2), different from said first network address (AD1), in said device configuration memory so that said function device is addressable in said network system using said second network address (AD2), wherein said control device is configured to assign and to send said second network address (AD2) to said function device, wherein said function device includes a predefined identifier, and said control device is configured to send said second network address (AD2) to said function device addressed with said predefined identifier.

2. Wireless network system according to claim 1, wherein said function device is configured to send said predefined identifier to said control device in response to said application control command or said conflict information.

3. Wireless network system according to claim 1, wherein said function device upon storing said second network address (AD2) provides an identification signal.

4. Wireless network system according to claim 1, wherein said communication interface is configured for use in a Zigbee network system.

5. Wireless network system according to claim 1, wherein said control device comprises a user control interface for initiation of said application control command.

6. Wireless network system according to claim 1, wherein said function device is a lighting unit comprising a light source, which light source is connected to said application interface.

7. Control device for use in a wireless network system according to claim 1, comprising at least a communication interface for transmitting and receiving data over a wireless medium, wherein said control device being configured to send an application control command to a function device with a first network address (AD1), to receive at least an acknowledgement signal from said function device and to send conflict information to said function device in case more than one acknowledgement signal is received.

8. Function device for use in a wireless network system according to claim 1, comprising at least a communication interface for transmitting and receiving data over a wireless medium, a first network address (AD1), a device configuration memory and an application interface connectable to an application device and configured to receive an application control command over said wireless medium, wherein said function device being configured to at least send an acknowledgement signal to a control device in response to a received application control command, and upon receipt of conflict information of said control device, to store a second network address (AD2), different from said first network address (AD1), in said device configuration memory so that said function device is addressable in said network system (10) using said second network address (AD2).

* * * * *